US010238090B2

United States Patent
Zoltanski

(10) Patent No.: US 10,238,090 B2
(45) Date of Patent: Mar. 26, 2019

(54) ABSORBENT GARMENT FOR A FOUR-LEGGED ANIMAL

(71) Applicant: Teresa Zoltanski, Denver, CO (US)

(72) Inventor: Teresa Zoltanski, Denver, CO (US)

(*) Notice: Subject to any disclaimer, the term of this patent is extended or adjusted under 35 U.S.C. 154(b) by 401 days.

(21) Appl. No.: 14/959,879

(22) Filed: Dec. 4, 2015

(65) Prior Publication Data

US 2017/0156295 A1    Jun. 8, 2017

(51) Int. Cl.
*A01K 23/00* (2006.01)
*A01K 13/00* (2006.01)
*A01K 1/015* (2006.01)

(52) U.S. Cl.
CPC ............ *A01K 23/00* (2013.01); *A01K 1/0152* (2013.01); *A01K 13/006* (2013.01); *A01K 2227/10* (2013.01)

(58) Field of Classification Search
CPC .... A01K 23/00; A01K 1/0152; A01K 13/006; A01K 2227/10
USPC .......................... 119/869, 857, 863, 865, 868
See application file for complete search history.

(56) References Cited

U.S. PATENT DOCUMENTS

| | | | | |
|---|---|---|---|---|
| 1,614,083 A | * | 1/1927 | Plantico | A01K 27/002 119/793 |
| 2,190,115 A | * | 2/1940 | Wolf | A01K 21/00 119/854 |
| 2,882,858 A | * | 4/1959 | Dlugi | A01K 37/00 119/853 |
| 2,974,635 A | * | 3/1961 | McDowell | A01K 13/006 119/854 |
| 3,247,846 A | * | 4/1966 | Fansler | A61F 13/64 602/70 |
| 3,335,721 A | * | 8/1967 | Gastwirth | A61F 13/64 128/DIG. 15 |
| 3,817,217 A | * | 6/1974 | Matuka | A01K 23/00 119/868 |
| 4,813,949 A | * | 3/1989 | O'Rourke | A01K 21/00 119/869 |
| 5,005,525 A | * | 4/1991 | Stanton | A01K 23/00 119/838 |

(Continued)

OTHER PUBLICATIONS

"How to Use Do Rites Disposable diapers", YouTube, 2016. Retrieved from: http://do-rites.com/how-to-use/.

*Primary Examiner* — Tien Q Dinh
*Assistant Examiner* — Ebony E Evans
(74) *Attorney, Agent, or Firm* — Kilpatrick Townsend & Stockton LLP

(57) ABSTRACT

A garment for a four legged animal can include a fabric body positionable around the rear of the animal to safeguard against excretion of bodily matter. The fabric body can include a lower portion positionable in front of the animal's rear legs and an upper portion positionable behind the animal's rear legs. Opposing edges of the fabric body between the front and upper portions can have an arcuate configuration that minimizes contact between the opposing edges and the animal's rear legs. A front attachment component coupled with the lower portion of the fabric body allows the lower portion to be positioned in front of the animal's rear legs and coupled about the animal's body. A rear attachment component coupled with the upper portion of the fabric body allows the upper portion to be positioned behind the animal's rear legs and coupled about the animal's body.

19 Claims, 6 Drawing Sheets

(56) References Cited

U.S. PATENT DOCUMENTS

| | | | | |
|---|---|---|---|---|
| 6,394,041 B1* | 5/2002 | Katz | ............ | A01K 23/00 |
| | | | | 119/868 |
| 6,557,497 B1* | 5/2003 | Milligan | ............ | A01K 23/00 |
| | | | | 119/850 |
| 6,647,928 B1* | 11/2003 | Spiller | ............ | A01K 21/00 |
| | | | | 119/854 |
| 6,895,901 B1* | 5/2005 | Howard | ............ | A01K 23/00 |
| | | | | 119/869 |
| 7,063,046 B1* | 6/2006 | Lin | ............ | A01K 21/00 |
| | | | | 119/854 |
| 8,535,364 B2* | 9/2013 | Margolis | ............ | A61F 7/10 |
| | | | | 2/400 |
| 8,992,495 B1* | 3/2015 | Howell | ............ | A01K 23/00 |
| | | | | 119/868 |
| 2012/0067298 A1* | 3/2012 | Rich | ............ | A01K 23/00 |
| | | | | 119/856 |

* cited by examiner

ABSORBENT GARMENT FOR A FOUR-LEGGED ANIMAL

BACKGROUND

Dogs, cats, and other four-legged animals often live or frequent places—indoors or in public places, for example—where urination by the animals on the ground or other surfaces is undesirable. And although animals may be trained to urinate in designated areas, even trained animals can suffer from incontinence and excitable urination. Products such as disposable diapers and washable wraps can be worn by the animal to capture urine, but these products can be problematic. For example, they can be difficult to don and doff, may interfere with the animal's tail, and can be uncomfortable and lead to chafing and balding if worn for long periods of time.

In the United States, there are approximately 75 million cats and 70 million dogs. About 7 million pets are given to shelters each year. Soiling of the owner's house is one of the most frequently cited reasons that people relinquish their pets to shelters. For example, soiling issues account for roughly 43% of cats being given to shelters and 18.5% of dogs being given to shelters. Likewise, bladder infections, urinary tract infections, or incontinence are one of the main reasons that cats and dogs visit their vet. Furthermore, some pets go into heat before they are spayed. In such instances, the pet's owner may want to prevent pregnancy and/or keep the animal dry and/or clean while in heat. For at least these reasons, it is desirable to have access to a comfortable and convenient pet product that can accommodate a pet's incontinence, bladder or other infections, menstrual cycles, leaking, marking, and/or other related issues.

SUMMARY

The present invention generally relates to providing a garment for a four legged animal to safeguard against excretion of bodily fluids and matter from their private areas, under their tail. Embodiments can include a fabric body positionable on the animal's body and shaped to minimize any discomfort of the animal. The fabric body can include a belly band, belt, or waist band, connecting adjustable straps, and attachment mechanisms that enable the garment to be adjusted, fitted, and comfortably worn by the animal with minimal interference of the animal's hind legs and tail. Additionally, a washable or disposable sanitary napkin, incontinence pad, or liner may be placed in or on the fabric body, for absorbency.

An example garment for a four-legged animal, according to the disclosure, includes a fabric body that is positionable around the rear of the animal to safeguard against incontinence or excretion of bodily fluid or matter. The fabric body includes a first fabric surface that is positionable underneath the animal's tail. The fabric body is fastened or connected to a belly band, belt, or waist strap that circles around the animal's stomach or belly and back. The belly band, belt, or waist strap connects to, attaches, fastens, and/or holds the fabric body up and in place, against the animal's tummy and rear, under their tail. The fabric body may also hold or secure an absorbent washable or disposable sanitary pad, or it can be the absorbent sanitary pad, or it can be a shield cover preventing leaking from the internal liner or absorbent pad.

Another option is for the fabric body to also include a fabric surface adjacent to the animal's belly when the fabric body is positioned around the rear of the animal, with a second fabric surface opposite the first fabric surface. The second fabric surface faces away from the animal when the fabric body is positioned around the rear of the animal. Use of the second fabric allows for the inclusion of a pocket to hold an absorbent pad, or the use of different types of fabrics to increase absorbency or protect against leakage. Additionally, use of the second fabric allows the use of different designs, colors, and styles.

The fabric body further includes a front or narrow lower portion that is positionable against or on the animal's tummy/belly or in front of the animal's rear legs when the fabric body is positioned around the rear of the animal. The fabric body also includes a wider rear or upper portion that is positionable behind the animal's rear legs, underneath the animal's tail when the fabric body is positioned around the rear of the animal. The upper or rear portion that covers the animal's rear is wider than the front or lower portion to provide greater coverage of the animal's private areas and provides sufficient area or space to hold a liner or an absorbent pad, and to facilitate the positioning of the upper or top rear portion and lower portion about the animal's body. The opposing edges of the fabric body between the lower and upper/top rear portions have an arcuated, hourglass, Y-shape, or inverted triangle or pear shape configuration that minimizes contact between the opposing edges and the animal's rear legs. The lower portion of the fabric body is sewn or formed onto or as part of the belly band, belt, or waist strap. Alternatively, the lower part of the fabric body includes a loop, tube, or fastening mechanism through which the belly band, belt, or waist strap can be inserted or threaded through, allowing the lower part of the fabric body to connect or be attached to, encircle, or go around the belly band, belt, or waist strap, under the animal's belly. A moveable loop, tube, tunnel, or removeable attachment, such as hook and loop, allows the lower portion to be moved, centered, and positioned on the belly band, belt, or waist strap in front of the animal's rear legs, under the belly. The upper part of the fabric body is fastened or attached to the belly, band, belt, or waist strap with clips, clasps, loops, straps, and/or fastening mechanisms, one on each side of the animal's tail that connect or fasten the upper portion of the fabric body to the upper portion of the belly band, belt, or waist strap. This allows the upper portion of the fabric body to be positioned underneath the animal's tail, behind the animal's rear legs, centered, and adjusted so it fits the animal.

Another example garment for an animal, according to the description, includes a fabric body that is positionable around the rear of the animal to safeguard against incontinence or excretion of bodily fluid or matter. The fabric body has a lower portion that is positionable in front of the animal's rear legs and an upper, top, or rear portion that is positionable behind the animal's rear legs when the fabric body is positioned around the rear of the animal. Opposing edges of the fabric body between the upper and lower portions have an arcuate, Y-shape, T-shape, hourglass, or inverted triangle or pear-shape configuration that minimizes contact between the opposing edges and the animal's behind and rear legs.

The garment further includes a lower attachment component that is coupled with the lower portion of the fabric body to allow the lower portion to be removeably attached to the belly band, belt, or waist strap, centered on the animal's belly, and positioned in front of the animal's rear legs when placed on the animal or while being connected to the waist strap or belly band or belt. The garment further includes two rear attachment components, one on each side of the animal's tail, that connects or fastens the upper, top, rear portion of the fabric body to the waist strap or belly band, belt, either directly from extensions of the fabric or indirectly with straps that are attached to or extend from the fabric body or waist strap or belly band, belt, in order to connect the top, upper, rear fabric body to the waist strap or belly band or belt. If indirectly, the straps are connected with fastening or connecting mechanisms, such as buckles, hook and loop, clasps, snaps, or other mechanical fastening mechanisms. Additionally, the connecting straps may be also adjustable, with buckles or elastic, similar to the straps, adjustments, materials, and features used on a pet collar, pet harness, garter belt, or an incontinence or sanitary napkin belt. This allows the upper, rear portion of the fabric body to be properly fitted on the animal, and centered and positioned under the animal's tail and behind the animal's rear legs. It is coupled about the animal's body. When the garment is fit about the rear of the animal, a substantial majority of the animal's back, hips, and behind remain exposed and uncovered by the garment.

An example method of making a garment for an animal, according to the disclosure, includes providing a fabric body that is configured for positioning over or around a rear of the animal to safeguard against incontinence or excretion of bodily fluid or matter. The fabric body has a lower portion that is positionable in front of the animal's rear legs and an upper, top or rear portion that is positionable under the animal's tail, on the animal's rear, behind the animal's rear legs when the fabric body is positioned around the rear of the animal. Opposing edges of the fabric body between the lower and upper portions have an arcuate, Y-shape, T-shape, or inverted triangle or pear-shape configuration that minimizes contact between the opposing edges and the animal's rear legs. The method further includes coupling a first attachment component with the lower portion of the fabric body to allow the lower portion to be positioned in front of the animal's rear legs and coupled about the animal's body, and coupling a second and third attachment component with the upper, top, rear portion of the fabric body to allow the upper or rear portion to be positioned underneath the animal's tail, behind the animal's rear legs and coupled about the animal's body.

Numerous benefits are achieved by way of the present invention over conventional techniques. For example, embodiments provided herein provide for absorbent garments for pets and other animals that minimize interference with the animal's hind legs and tail. The garments can be disposable or washable and can incorporate reusable, washable, or disposable absorbent liners, incontinence pads, or sanitary pads for ease of use. Furthermore, the garments can include buckling, snaps, hook and loop, fabric straps or loops, tubes, tunnels, elastic, or other attachment or fastening mechanisms that facilitate movement of the fabric body or donning and doffing of the garment, liners, and absorbent pads. These and other embodiments of the invention, along with many of its advantages and features, are described in more detail in conjunction with the text below and attached figures.

Figure 1:
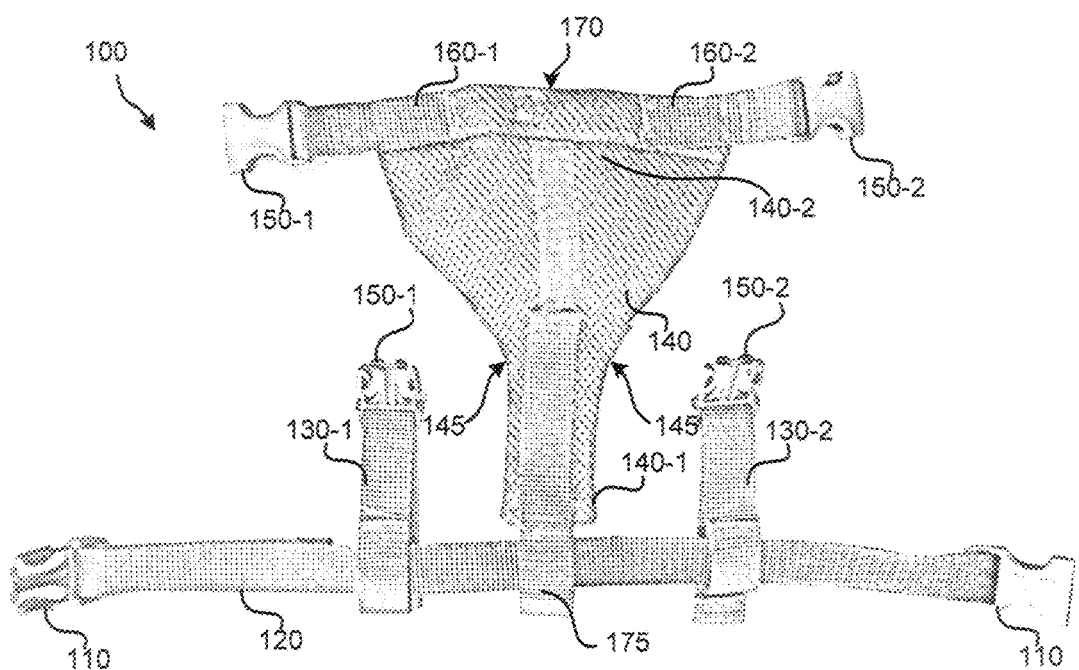
FIG. 1 is a plan view of an absorbent garment according to a first embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments provided herein generally relate to providing an absorbent garment for a four-legged animal to safeguard against excretion of bodily fluid or matter. It will be understood that the drawings and descriptions provided herein are provided as examples. A person of ordinary skill in the art will recognize that features may be added, omitted, rearranged, replaced with equivalent features without departing from the scope of the invention.

As described above, pet owners may face a variety of challenges in raising a pet and keeping their pet or home clean and dry, such as house breaking or their pet's menstrual cycles, spraying or marking, medical conditions like incontinence or urinary tract infections, infections, accidents or injuries, old age, and the like. Conventional solutions to these problems have typically focused on the use of male wraps or belly band, belts that are positioned around the pet's waist with an absorbent pad being placed on the interior of the male belly belt and/or the use of diapers. The use of male belly belts or wraps are relatively effective in preventing unwanted urination or marking from male dogs or other pets whose privates are located on their belly. However, they are not effective in preventing unwanted urination, leaking, menses, or marking by female dogs and other animals, such as cats or rabbits, whose private anatomy is located under their tail, not on their belly. As a result, diapers are commonly used for female dogs and other animals or household pets whose privates are located under their tail, such as cats or rabbits.

Pet diapers typically include a hole that is cut in the middle of the diaper to accommodate the pet's tail. These diapers, however, create their own problems and are thus not very effective. For example, having a hole in the middle of the diaper creates and allows leakage in and around the tail hole. Also, neither the tail hole nor the diaper can be adjusted to fit the different sizes or types of animal tails or behinds. Additionally, diapers use the animal's tail to hold the diaper up, but some animals don't like things attached or connected to their tails, so they try to remove or shred the diaper. Also, if the animal doesn't have a long tail, such as rabbits or dogs with short or docked tails, the diaper droops or falls down or comes off. For animals with short tails, the pet diaper tail hole must be taped shut. And, some animals don't like diapers being pulled over their tails as it rubs their fur the wrong way. If the owner uses baby diapers instead of pet diapers, they do not fit the animal properly. Both pet and baby diapers cover the animal's tail, hips, rear, and back, allowing the animal's bodily fluids, matter, or moisture to spread over the animal's tail, hips, and back, which is uncomfortable, unhealthy, and/or unsanitary. Additionally, diapers are bulky and uncomfortable to wear. They also interfere with the pet's gait, making it hard to walk or get around. If diapers are worn for a long time, they also cause matting of the fur, rubbing, skin rashes, chaffing, or skin infections. These and other problems often result in the pet's discomfort or unwillingness to wear diapers. Further, pet diapers are commonly expensive, with the costs averaging around $1 per diaper. Also, diapers come in standard sizes and are often not very adjustable resulting in a pet owner using diapers that are too large or too small for the pet, which increases the pet's discomfort in wearing them. Additionally, a disposable diaper is much bigger than a disposable sanitary napkin, panty liner, or incontinence pad, thus disposable diapers create more waste, are not eco-friendly, and result in more land-fill.

Provided herein is a pet sanitation shield (hereinafter shield) that solves these problems. It is adjustable, removable, re-usable, and/or washable. The shield has a smaller profile than a diaper and is more comfortable. It allows the use of washable or disposable sanitary napkins, panty liners, or incontinence pads. The shield is useful for pets needing extra protection when leaking, flowing, marking, discharging, or urinating from the area under their tail. The shield may be especially useful for female dogs and other four-legged household pets, such as cats and rabbits, whose private anatomy is located under their tail. It is an eco-friendly, affordable, and/or comfortable alternative to diapers for animals or pets who are incontinent, in heat, having their period, leaking, not potty trained, or might otherwise need to wear a diaper. The shield is an adjustable, removable, washable, and re-usable incontinence or sanitary pad, pad cover, or both. It may or may not include absorbent material on the opposite side (inside) of the shield. The shield may or may not include a pocket or pouch to insert a sanitary napkin or incontinence pad.

The shield is typically positioned on the animal's waist strap, belly band, or belt through a loop on the lower end of the shield. The loop is attached onto or looped over the belly band, belt, or waist strap. Alternatively, the belly band, belt, or waist strap is threaded through a loop, tube, or tunnel on the lower end of the shield. The shield enables an insert, such as a washable or disposable sanitary napkin, panty liner, or incontinence pad, to be placed directly on or against the interior or inside of the shield. The napkin, liner, or pad may also be inserted in a pocket or pouch in the shield.

The shield offers at least the following advantages: positioning and adjustability around the pet's waist or belly; use of a standard disposable over-the-counter sanitary pads for convenience and/or different absorbency needs; interchangeability of the components based on style preference, choice of materials, pet needs, and the like; the option to add an absorbent pad on the inside or interior of the shield for increased absorbency; the inclusion of an exterior or top pocket to enable one or more pads to be inserted within a pocket for extra absorbency of heavier flow; the inclusion of a quick release mechanism, such as a buckle, that allows a user to remove, change, or add a new pad or shield; the ability to change or add a pad without removing the shield from or about the pet's waist or belly; and adjustability about the pet's waist, belly, or body to accommodate different pet shapes and sizes. In addition to the above, because the shield is not positioned entirely around the pet's rear, the shield allows air to circulate freely over the majority of the pet's body, keeping the dog or pet happier, more comfortable, drier, and freer to move.

As described herein, the shield or pad cover may be fitted to the pet by connecting or fastening it to a waist strap, belt, or belly band that fits around the pet's waist or belly (hereinafter belly band). The belly band described herein may be stretchable or adjustable about the pet's waist or belly. In some embodiments, the waist or belly band may include a buckle, Velcro®-style hook and loop, double D rings, snaps, elastic, hooks, ties, clasp and the like, that enables the waist or belly band to be adjusted and closed, so that it comfortably fits around the pet's belly or waist. In some embodiments, the belly band may include two front adjustable straps with a clip, loop, clasp, hook and loop, straps, loops, buckles, or other fastening mechanism that connect the belly band to the fabric body or connect the fabric body to the belly band. These adjustable straps and fastening connectors are similar to those used in dog collars, dog harnesses, incontinence or sanitary napkin belts, and/or garter belts.

A disposable sanitary napkin or incontinence pad may then be placed or positioned in a pocket of a pad cover of the shield, or placed on the interior surface of the shield, pad, or pad cover. The shield, pad, and/or pad cover may be fastened, connected or attached to the belly band. The shield, pad, and/or pad cover may be attached or connected to the belly band via mechanical fasteners, such as buckles, clasps, or hook and loop. Alternatively, it may be attached or connected to the belly band by inserting the belly band through a loop, tube, or tunnel of the shield, pad, and/or pad cover. In some embodiments, the shield, pad, and/or pad cover may include hook and loop portions that enable the pad cover to be adjusted, positioned and secured around the belly band. In some embodiments, the shield, pad, and/or pad cover (hereinafter "pad cover") includes an adjustable and/or removable lower Y-strap or T-strap to allow the pad cover to be quickly adjusted and/or removed from and replaced on the belly band, such as for washing, changing, going outdoors, and/or size adjustments. For example, the pad cover may be quickly detached and re-attached to the waist belt or belly band to obtain the best fit and size for the pet.

When using the pad cover with elastic or adjustable fastening straps, it is preferable to ensure that the fastening mechanism of the strap is facing downward or in the same direction as the animal's fur, in order to comfortably secure the fabric body and prevent unwanted rubbing or irritation of the pet's skin.

The belly band may be positioned, adjusted, and fitted about the pet's waist or belly. The belly band or the fastening straps are adjusted about the pet to ensure that the fastening straps are aligned to connect or fasten the edges, corners, seams, ends or connection points on the fabric body. The belly band may be cinched or adjusted for a close and comfortable fit. Having provided a general description of the invention, additional aspects and features will be further realized with reference to the description of the several drawings provided below.

FIG. 1 is a plan view of an absorbent garment 100 according to a first embodiment. This embodiment includes a fabric body 140 and two buckling 150, connecting materials, or fastening mechanisms to connect the fabric body on each side of the animal's tail or rump. A first fastening, connecting, or buckling mechanism includes the rear belly band strap 120 and a pair of buckles 110 for closing, adjusting, and/or fastening the ends of the belly band. A second connecting or buckling mechanism includes one or more top or front straps 160 or side straps 130 (labeled separately in FIG. 1 as a left strap 130-1 and a right strap 130-2), along with buckles, clips, clasps, connecting materials, or fastening devices 150-1, 150-2. The side straps 130 fasten a left portion and a right portion of the rear strap 120 to respective left (160-1) and right (160-2) front straps. In this embodiment, the length of one or more of the straps 120, 160, 130 can be adjustable to enable the absorbent garment 100 to properly fitted or cinched around the animal's body. Additionally or alternatively, the fabric body 140 can include arctuated, Y-shape, T-shape, or inverted triangular extensions or elastic or adjustable straps, like little arms extending out from the top of the fabric body, to clasp, encircle, connect or fasten the fabric body 140 to the belly band 120. Additionally or alternatively, the size, shape, materials, and/or other features of the absorbent garment can vary, depending on manufacturing concerns, availability and affordability of materials, desired style, animal size or type, gender, absorbency coverage and needs, and/or other factors.

The fabric body 140 is removeably fastened, attached, or connected to the belly band 120 by threading the belly band 120 through the lower tunnel, strap, or loop 140-1 and/or 175. Alternatively, hook and loop or other removeable and/or adjustable fastening material may be used to cover or connect to the belly band 120 and connect the fabric body 140 to the belly band 120.

The shape of the fabric body can be designed to minimize any discomfort felt by the animal. As shown, the lower portion 140-1 of the fabric body can be narrower or have a smaller width than the top or upper portion 140-2 of the fabric body to allow the back portion 140-1 to fit between the hind legs of the animal.

Also, the belly band 120 may be threaded through the lower loop, tube, or tunnel 175. Alternatively, the fabric body 140 and 140-1 may be sewn directly onto the belly band at 175, which is usually centered so it will be placed on the animal's waist or belly, under their belly button, between their hind legs.

Furthermore, opposing edges 145 of the fabric body 140 between the lower and top or upper or rear portions 140-2, 140-1 can be arcuated or narrowed to properly fit between the animal's legs and minimize contact with the animal's hind legs, further reducing the likelihood of chafing, gait impairment, or other discomfort.

When the absorbent garment 100 is fastened to the animal, the fabric surface of the fabric body visible in FIG. 1 is positioned adjacent or next to the animal's behind and belly, and may include an opposing fabric surface (not visible in FIG. 1) facing outward from the animal. Although some embodiments may include a fabric body 140 comprising a uniform type of fabric, other embodiments may include different types of fabrics for these different surfaces. In the embodiment shown in FIG. 1, for example, the fabric surface of the fabric body 140 adjacent to the animal comprises a polyester mesh that allows liquids easily pass through, while the surface of the fabric body 140 facing outward from the animal comprises an absorbent or cotton fabric. Another embodiment would include a third fabric surface to prevent fluids from leaking, such as a polyurethane exterior, as in a diaper cover, with the absorbent fabric(s) being on the interior. And, another or third embodiment would be the use of only one fabric or a single layer which would be a pad cover, an absorbent pad, or both. In all these embodiments, a washable or disposable pad could be placed directly onto the interior of the shield, pad cover or absorbent pad. Or, it could be as a single piece of fabric for pets with small occasional leaks, such as when traveling or after surgery, as they may only need a light pad cover or single layer absorbent pad.

Fabrics and other materials of the belly band 120 and fabric body 140 can vary. To facilitate cleaning, the materials utilized may enable the absorbent garment 100 to be machine washable. In some embodiments, a pad or liner made from an absorbable material is placed directly onto the interior fabric surface of the fabric body 140 and other embodiments, the pad or liner is place between the fabric surface of the fabric body 140 adjacent to the animal and the fabric surface facing outward from the animal. In some embodiments, the liner may be washable and/or disposable, and may be removable from the fabric body 140. The liner may be inserted via a pocket or an opening in the fabric body 140, such as along the front edge 170 or along and through the center or side of the fabric body. The liner may also be placed directly on the interior or inside surface of the fabric body, like a panty liner being placed on the inside of a panty. The fabric body may further employ means for keeping the pocket or opening closed, such as a hook-and-loop fastener, button, snap, zipper, loop or tie, and the like.

Depending on desired functionality, numerous variations can be made to the embodiment of the absorbent garment 100 shown in FIG. 1. Embodiments may replace a single strap with multiple straps, or vice versa, and the strap may be eliminated by forming the upper and lower connections into, as part of and as an extension of and from the fabric body 140. (For example, a single front strap may replace left front strap 160-1 and right front strap 160-2 illustrated in FIG. 1.) Any of a variety of materials, such as the natural and synthetic materials commonly found in sanitary, diaper, or incontinence garments, pet collars, pet harnesses, and/or fasteners may be used in the fabric body 140 and/or straps 120, 160. These can include, for example, cotton, wool, hemp, polyester, plastic, nylon, rayon, acrylic, mesh, webbing, elastic, and/or the like, including any blend or other combination thereof. Furthermore, as shown in a second embodiment described below in relation to FIG. 2, any of a variety of fasteners can be used in addition or as an alternative to the buckles 110, 150. Additional fastening means can include, for example, clips, clasps, clamps, snaps, buttons, hook-and-loop fasteners, latches, ties, and the like.

Figure 2:
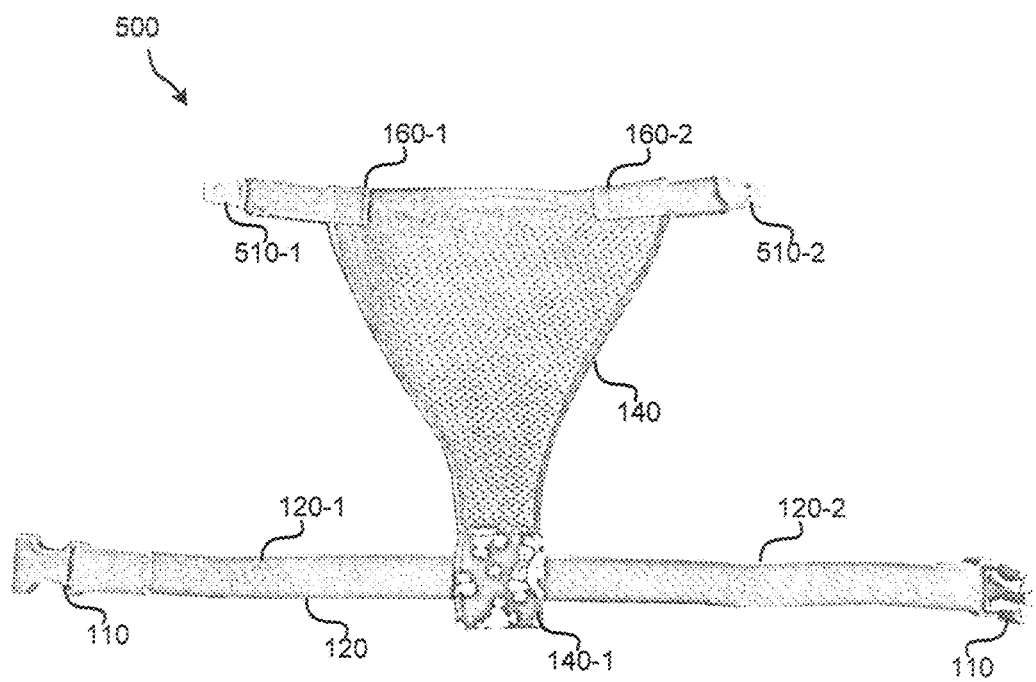
FIG. 2 is a plan view of an absorbent garment according to a second embodiment.

FIG. 2 is a plan view of an absorbent garment 500 according to a second embodiment. Features similar to the absorbent garment 100 of FIG. 1 are labeled similarly. Here, however, rather than being adjustable, the top or upper straps 160 and belly band strap 120 are made from an elastic material that stretches and contracts to hold the absorbent garment 500 in place on an animal. Some embodiments may include both adjustable non-elastic and/or elastic straps, or include straps that are either adjustable or elastic. Also, rather than side straps 130, the absorbent garment 500 of FIG. 2 has a left fastener, clasp or clamp 510-1 and a right fastener, clasp, or clamp 510-2 that fastens, clasps, or clamps onto the belly band, belt, strap 120 directly (e.g. at a corresponding left portion (120-1) and right portion (120-2) of the belly band strap 120). Further, in this embodiment, material on the surface (not visible) of the fabric body 140 facing away from the animal wraps around the belly band strap 120 to form the lower or bottom portion 140-1 of the fabric body 140. The same features described in FIG. 1 apply to this figure, including but not limited to the use of a single layer of fabric, and/or double layers of fabric with an absorbent interior material and/or a leak-proof exterior material, such as polyurethane.

Again, the size, shape, materials, fasteners, and/or other features of the absorbent garment can vary, depending on manufacturing concerns, affordability and availability of materials, desired style, animal's needs and comfort, animal's needs, type, gender, and/or other factors. In some embodiments, curved sides of the fabric body 140 can have a constant radius, and the curved portion extends from the top of the fabric body 140 or upper strap 160 of the front buckle mechanism 510 to the lower strap or loop 140-1 or middle connection on the belly band 120. In other embodiments, as shown, the arcuate, Y-shape, T-strap, hourglass, or inverted pear-shape configuration of the fabric body's opposing edges can be a curved portion having a constant radius, where opposing edges can also include a straight portion that is positioned in front of the curved portion. In some embodiments, the garment may include an additional fabric body (not shown) that is opposite of and attachable to the fabric body that is positioned on the front of the animal's body adjacent to their belly. The additional fabric body may form a back portion of the garment that is positionable around the animal's back when the garment is placed about the animal's body. The back portion or additional fabric body may be attached to the front or lower portion or fabric body via the front and/or rear buckle mechanisms and the like. In this manner, the fabric's body may fully surround the animal's body when the garment is placed about the animal. Positioning the fabric body around the animal's body in this manner may provide additional absorbency, style, or comfort, such as to reduce chaffing or local irritation that may occur from the use of a belly band or straps.

Figure 3:
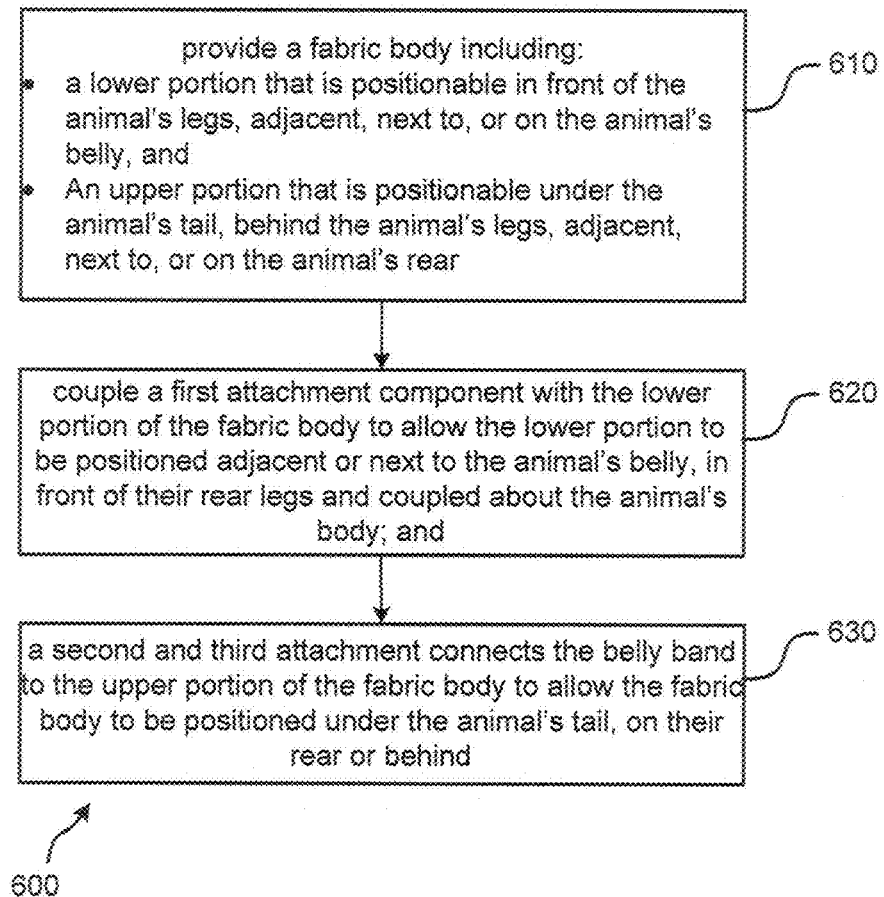
FIG. 3 is a flow diagram illustrating an embodiment of a method of fabrication of an absorbent garment.

Embodiments may be fabricated in any of a variety of ways. FIG. 3 is a flow diagram illustrating an embodiment of one such method 600 of fabrication of an absorbent garment.

At block 610, a fabric body is provided, where the fabric body has a lower portion positionable in front of the animal's rear legs, adjacent, next to or on the animal's belly, and an upper portion that is positionable behind the animal's rear legs adjacent, next to, or on the animal's rear, underneath their tail, when the fabric body is positioned around the rear of the animal. As previously discussed herein, the shape and size of the fabric body can vary to properly fit the animal and safeguard against incontinence or excretion of bodily fluid or matter. This can depend on factors such as the animal's needs, size, type, gender, and the like. Opposing edges of the fabric body between the upper and lower portions can have an arcuate, Y-shape, T-shape, hourglass shape, or inverted triangle or pear-shape configuration that maximizes the coverage where needed and minimizes coverage where it is not needed, and minimizes contact between the opposing edges and the animal's rear legs.

At block 620, a first attachment component is coupled with the lower portion of the fabric body to allow the lower portion to be positioned adjacent or next to the animal's belly, in front of the animal's rear legs. As previously discussed, the attachment component can comprise a tunnel, tube, or loop made of fabric, elastic, or webbing straps, or other synthetic or natural material or fabric that is used with pet harnesses or incontinence/sanitary napkin belts, or it may comprise a removable, releasable materials such as hook and loop.

At block 630, a second and third attachment component connects the belly band to the upper portion of the fabric body to allow the upper portion to be positioned under the animal's tail, on their rear or behind, behind the animals rear legs. As with the first attachment component, the second and third attachment component can comprise any of a variety of attachment mechanisms, such as buckles (e.g., the buckles 150 of FIG. 1), clamps (e.g., the clamps 510 of FIG. 2), snaps, buttons, hook-and-loop fasteners, and the like.

It should be appreciated that the specific blocks shown in FIG. 3 illustrate a method 600 of fabricating an absorbent garment for an animal, according to one embodiment. Other embodiments may vary from the embodiment shown. For example, steps may be added, removed, and or rearranged, depending on the particular application. For example, a method may further include coupling a liner with the upper portion of the fabric body, where the liner includes an absorbable material that absorbs bodily fluid or matter excreted by the animal. Additionally or alternatively, providing the fabric body can include attaching a first material with a second material to form a first surface of the fabric body and a second surface of the fabric body opposite the first surface, as described herein.

Methods may additionally or alternatively include steps of positioning the garment on an animal. For example, the method 600 may include positioning a top portion of the garment around the animal's back; and coupling the top portion with the fabric body via the first attachment component and/or second attachment component. When the garment is fit about the rear of the animal, the animal's back may remain exposed and uncovered by the garment so that air is freely accessible about and to the animal's back. Exposing the animal's back keeps the animal drier and provides the animal comfort when wearing the garment. Additionally or alternatively, the method may include positioning a top edge of the upper portion adjacent the animal's anus without covering the anus, and/or adjusting the attachment components to cinch the fabric body about the animal's body. One of ordinary skill in the art would recognize many variations, modifications, and alternatives.

Figure 4:
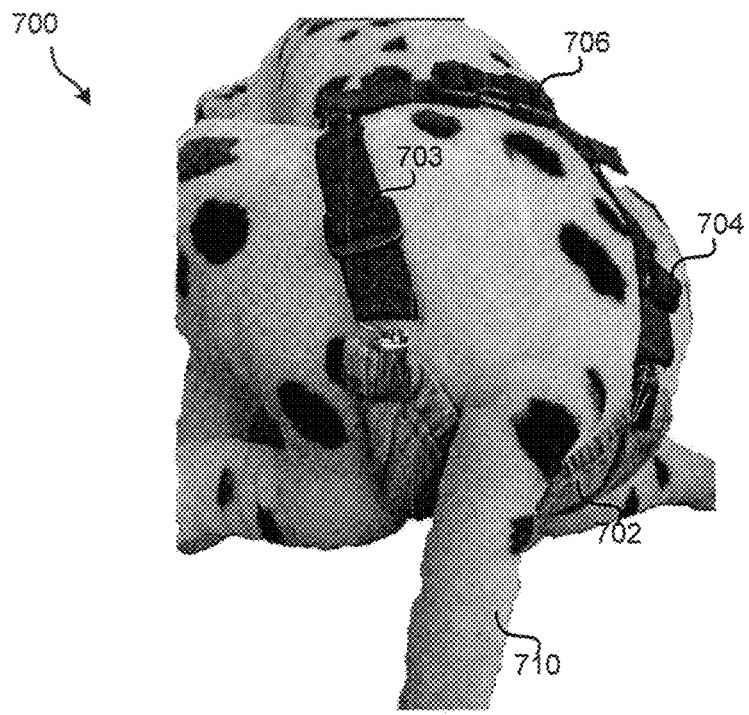
FIGS. 4 and 5 are perspective view of an absorbent garment according to a third embodiment.
Figure 5:
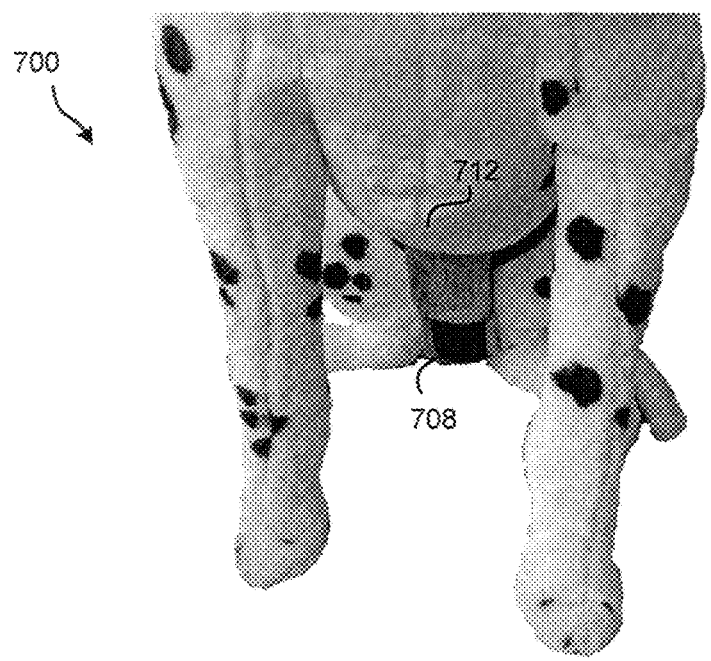

FIGS. 4 and 5 are perspective view of another embodiment of a garment 700 that may be fitted about an animal to provide protection against incontinence and/or other issues as described herein. Garment 700 may have a configuration similar to that shown in FIG. 2 wherein the garment 700 includes a fabric body 702 having a narrow proximal end and a wider distal end. The fabric body 702 is attachable to a main strap 706 or belly band that is positionable around the belly or waist of the animal. The belly band or main strap 706 may be positioned around the belly or waist of the animal via a fastener, such as a Velcro-style hook and loop strap, releasable buckle, snaps, ties, clasps, and the like. As shown in FIG. 4, the wider distal end of the fabric body 702 is attachable to the main strap 706 via a first side strap 703 and a second side strap 704 that are positioned on opposite sides of the animal's tail 710, which allows the tail 710 to remove exposed and move freely, unencumbered by the fabric body 702 and straps, 703 and 704.

In some embodiments, the straps, 703 and 704, may be integrally formed with the fabric body 702 via extensions from the fabric body, stitching, adhesive bonding, RF welding, heat welding, and the like. In other embodiments, the straps, 703 and 704, may be removably attached to the fabric body 702 via buckles, straps, clasps, loops, or fasteners as shown in FIG. 4. Opposite end of the straps, 703 and 704, may be attached to the main strap 706 via buckles, clasps, loops, fasteners, Velcro-style hook and loop, and the like. In yet other embodiments, the straps, 703 and 704, may be removeably attached to the belly band or waist strap 706. And, in other embodiments, the straps, 703 and 704, may be integrally formed with the main strap 706, as extensions from or attachments to the main strap 706, via any method known in the art, including sewing or heat bonding. Additionally, in some embodiments, the fabric body 702 may have elastic or gussets along the edges or seams, to provide a snug fit and contain or prevent leakage and provide extra room for holding an absorbent pad.

As shown in FIG. 5, the narrow proximal end of the fabric body 708 is also attached to the main strap 706 and is positioned adjacent the animal's belly or waist 712. In some embodiments, the narrow proximal end of the fabric body 708 includes a loop, tunnel, tube, or hook and loop fastening material, which allows the end of the fabric body 708 to be positioned and folded around the belly band strap 706 and attached to itself as shown. In other embodiments, the proximal end of the fabric body 708 includes snaps, fasteners, and the like, that attach the fabric body 708 around, over, to, or with the belly band strap 706. In yet other embodiments, the proximal end of the fabric body 708 is integrally formed with the belly band strap 706 via an extension from the fabric body forming the belly band from the fabric body, or stitching, adhesive bonding, RF welding, heat welding, and the like. In other embodiments, the proximal end of the fabric body 708 forms a loop at the end, in order to thread the belly band or main strap 706 through.

An advantage of embodiments in which the proximal and distal ends of the fabric body 702 and 708 are removably attached with main strap 706 is that the fabric body 702 and 708 may be adjusted on the belly band main strap 706 to better fit the animal, and also may be removed from the main strap 706 and replaced with a different fabric body 702 and 708. Depending on the animal's needs and the pet owner's preferences, a pet owner may remove the fabric body 702 for cleaning and/or to use a different style or type of fabric or material. For example, if the pet owner is on vacation and wishes to use a fabric body 702 that is symbolic of the vacation destination or a special occasion, the owner may easily remove and replace the fabric body 702 without removing or replacing the other components of the garment, such as main strap 706 and/or side straps 703 and 704.

Positioning the wider distal end of the fabric body 702 adjacent the animal's rear provides increased coverage and protection against incontinence and/or the other potential issues describe herein. Positioning the narrow proximal end between the legs and adjacent the belly reduces contact between the fabric material and the animal's legs and belly, which is more comfortable for the animal, and may reduce chaffing or other potential irritations. This configuration also increases the animal's ability to use and move its legs, which increases the animal's comfort in wearing the garment 700. The arcuate, Y-shape, hourglass shape, or inverted triangle or pear shape configuration of the garment's sides between the narrow proximal end and the wider distal end further reduces chaffing or contact with the animal's legs, providing far greater comfort than conventional incontinence garments, such as diapers.

Figure 6:
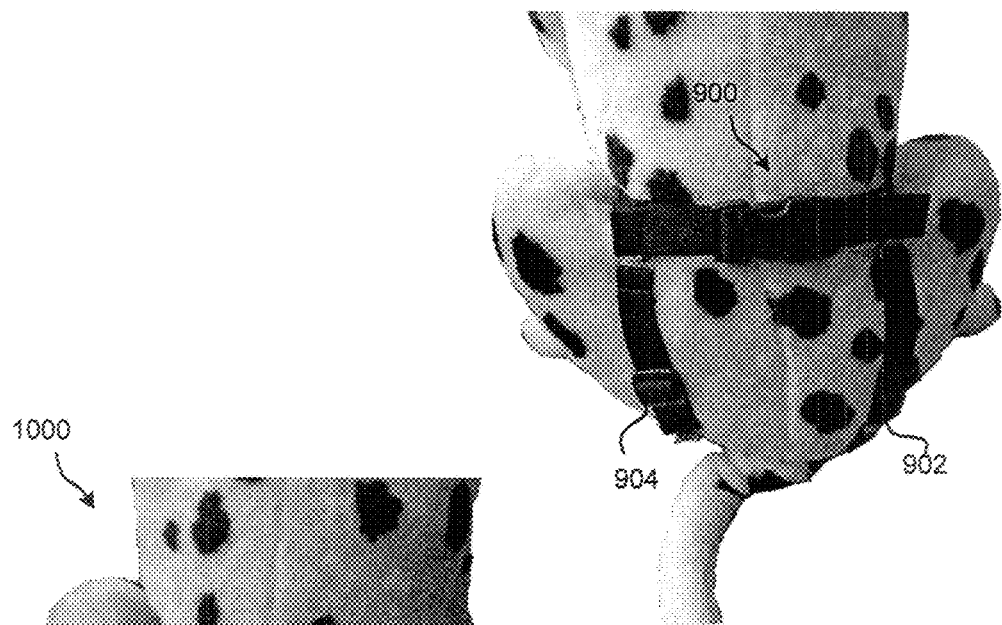
FIG. 6 is a view of an absorbent garment from the rear of an animal.

FIG. 6 illustrates that the garments described herein provide far greater freedom and exposure of the animal, which greatly increases the animal's comfort in wearing the garment. For example, as shown in FIG. 6 with the garment fit about the animal's waist, a substantial majority of the animal' back 900 is exposed or not covered by the garment. Only the main strap 900 and the side straps, 902 and 904, cover the animal's back. Because nearly the entire back of the animal is exposed or uncovered, the animal experiences far greater comfort. For example, air is able to easily and freely access the animal's back which helps keep the animal cool and dry. In addition, the fur or hair on the animal's back is not bent or rubbed by the garment, which avoids unnecessary irritation. The animal's tail is also exposed and able to easily and freely move.

As described previously, the use of a belly band coupled with the narrower design of the garment's fabric body minimizes the contact of the garment with the animal's body, back, belly, and waist, thereby enhancing the animal's comfort. As described above, the term "substantial majority of the animal' back being exposed or uncovered" means that greater than at least 70% of the animal's back is not covered by the garment. In some embodiments, greater than 80% of the animal's back, greater than 90% of the animal's back, or greater than 95% of the animal's back remains uncovered. This is especially important near the animal's rear which is otherwise covered with a diaper.

Figure 7:
FIGS. 7 and 8 are front and rear views of an absorbent garment according to a fourth embodiment.
Figure 8:
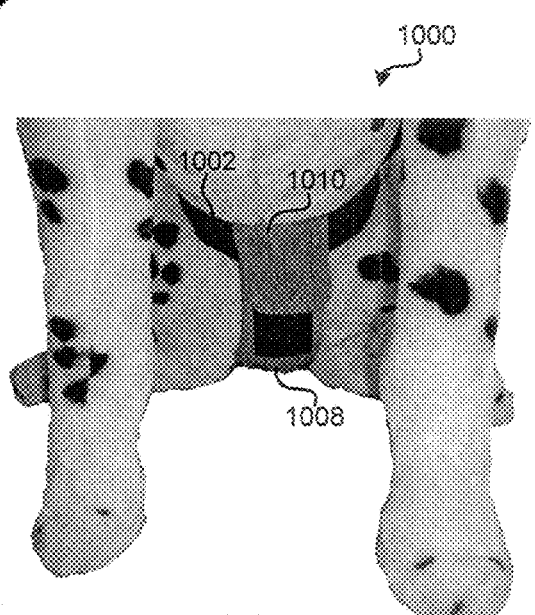

FIGS. 7 and 8 illustrate another embodiment of a garment 1000 that may be fitted about a pet. The garment 1000 is similar to those previously described with a narrow proximal end and a wider distal end and two side straps 1004 and 1006. The garment 1000 is different than those previously described because the garment 1000 is configured to be fitted and secured about a conventional belly band or belt 1002. The belly band 1002 may be a belt 1002 that an owner likes or knows a pet will wear, such as from past experience. The use of the belt 1002 may ensure that the pet is stylish and/or comfortable when adding the garment 1000 and may provide confidence in wearing the garment 1000. With the belt 1002 fit about the animal's waist, the side straps 1004 and 1006 may be releasably secured to the belt 1002 via fasteners, clasps, clamps clips, buckles, snaps, loops, or other fastening devices. The fasteners, clasps, or clamps may grip the belt 1002 without damaging the belt. The narrow proximal end of the garments fabric body 1008 may be looped over or folded around the front portion of the belly band or belt 1002. If folded over, it may be sewn, fastened, or secured back on itself via Velcro®-style hook and loop fasteners, buttons, clamps, clips, buckles, snaps, thread, a loop, and the like.

Figure 9:
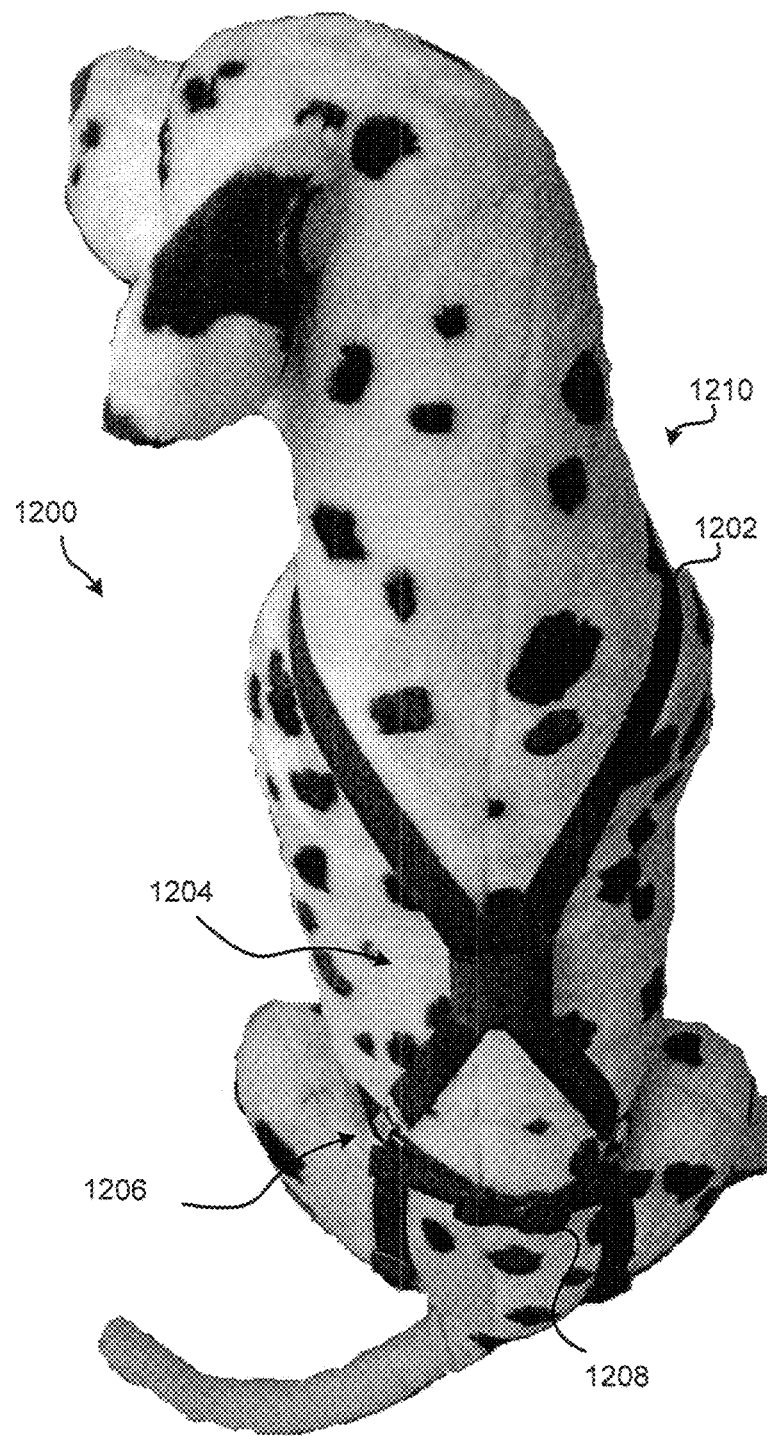
FIG. 9 is a rear view of a shoulder strap for an absorbent garment according to a first embodiment.
Figures 10, 11:
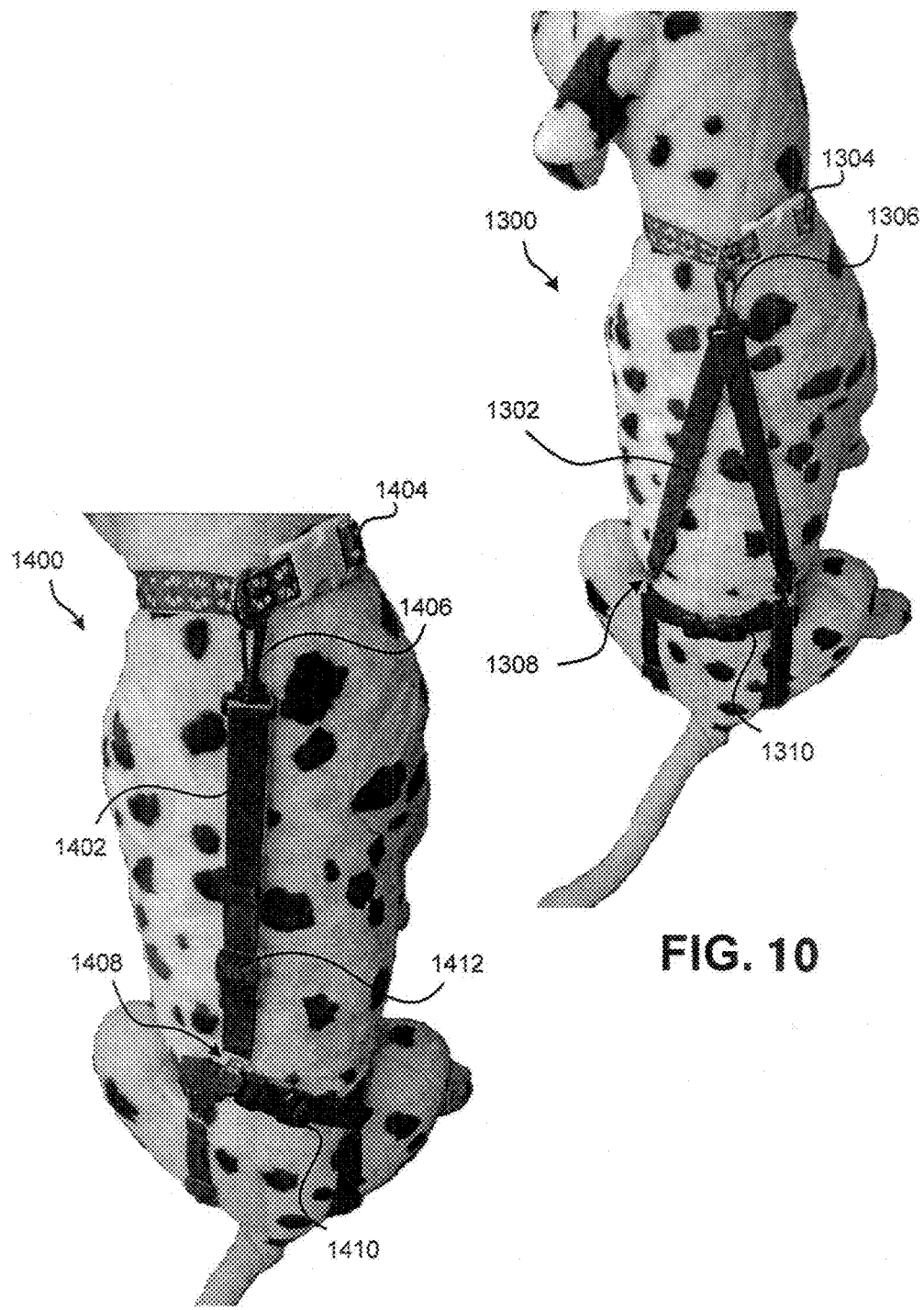
FIG. 10 is a rear view of a shoulder strap for an absorbent garment according to a second embodiment.
FIG. 11 is a rear view of a shoulder strap for an absorbent garment according to a third embodiment.

FIGS. 9-11 illustrates embodiments of components that may provide additional support for an incontinence garment that is fit about an animal's waist. The additional support is provided via a shoulder strap that runs along the animal's back and is coupled with the belly band or main strap of the garment. The shoulder straps aids in ensuring that the garment does not migrate or move down or around the animal's body if the animal tries to remove it or if the garment is worn for a longer time.

As shown in FIG. 9, in one embodiment, the should strap 1200 may form a loop 1202 at one end that is positioned around the animal's chest or front neck 1210 and over the animal's shoulders. The shoulder strap 1200 crisscross at a mid-section and couples with the mains strap 1208 of the garment at two or more locations via fasteners 1206, such as clamps, buckles, clips, locks, buttons, snaps, clasps, and the like. In other embodiments, the shoulder strap 1200 may be integrally formed with the main strap 1208 of the garment via stitching, adhesive bonding, RF welding, heat welding, and the like. The shoulder strap 1200 may also be adjustable via the use of elastic or stretch fabric, a buckle, slider, or an adjustment mechanism 1204, which may be used to increase/decrease the size of the strap's loop 1202 and/or used to lengthen/shorten the strap between the animal's shoulders and rear. The buckle, slider, or adjustment mechanism 1204 allows the strap to be adjusted to accommodate various different shaped and sized animals. The adjustment mechanism 1204 may also be used to vary the crisscross point of the straps and/or may be used to retain and conceal the excess portions of the straps.

Positioning the loop 1202 over the animal's chest and just below the front neck 1210 increases the contact area of the strap and animal's body, thereby minimizing pressure points and reducing unnecessary rubbing or chaffing. The position of the loop 1202 and/or 1204 also helps to ensure that the strap does not pull on the animal's neck. Having two or more locations to connect, fasten, clip, or couple between the shoulder strap 1200 and the belly band strap 1208 helps distribute the load while pulling the garment upward or toward the animal's chest. This helps the garment stay up and reduces twisting, slipping, sliding, bunching, dropping, or folding of the garment. In some embodiments, however, the shoulder strap 1200 may be coupled with the main strap 1208 at a single location and/or via a single strap.

FIG. 10 illustrates another embodiment of a shoulder strap 1300. Shoulder strap 1300 is configured to attach or couple with the animal's collar 1304 via a fastening mechanism 1306, such as a clip, clasp, snap, buckle, button, Velcro®-style hook and loop fastener, and the like. This allows the shoulder strap 1300 to be attached to an existing D-ring or other ring or feature of the animal's collar 1304. Two strap segments 1302 extend from the fastening mechanism 1306 and couple with the main strap 1310 via fasteners 1308. The two strap segments 1302 may be slidably positioned within a ring that is positioned on the end of the fastening mechanism 1306. The two strap segments 1302 may slide within the ring to equalize a tension in each segment and/or to accommodate movement and flexation of the animal's body. One or both strap segments 1302 may include an adjustable D-ring or other component that allows the length of the strap segment 1302 to be adjusted to accommodate the shape and size of the animal. This embodiment can be used with strong breeds that use a standard collar; it should not be used on animals that have breathing problems. With animals that use a harness, instead of attaching the top clasp 1306 to the collar, it can be attached or fastened to the leash ring on the animal's harness.

FIG. 11 illustrates an embodiment of a shoulder strap 1400 that is similar to the shoulder strap of FIG. 10. Specifically, the shoulder strap 1400 of FIG. 10 includes a fastening mechanism 1406 that allows the strap to be removably coupled with the animal's collar 1404. The should strap 1400 of FIG. 11, however, includes a single strap segment 1402 that extends from the fastening mechanism 1406 and couples with the belly band strap 1410 via a fastener 1408. The single strap segment 1402 includes an adjustable buckle or slider 1412 that allows the length of the singe strap segment 1402 to be adjusted as needed. This embodiment can be used with strong breeds that use a standard collar; it should not be used on animals that have breathing problems. With animals that use a harness, instead of attaching the top clasp 1306 and 1406 to the collar, it can be attached or fastened to the leash ring on the animal's harness.

The use of the shoulder straps in FIGS. 10 and 11 allows additional support to be provided via the use of the animal's existing collar. Because the animal is likely familiar with the existing collar, the use of the shoulder straps that engage with the collar may increase the animal's comfort and confidence in wearing the shoulder strap and/or garment. The shoulder straps of FIGS. 9-11 are fully removable from the garment and, thus, may only be used when needed or required. If the animal feels more comfortable without the shoulder straps, the straps can be quickly and easily removed. Thus, in some embodiments the shoulder straps may only be employed when needed, such as when walking the animal. The use of the shoulder straps illustrated in FIGS. 9-11 ensure that a substantial majority of the animal's back remains exposed and uncovered from the garment as described above, thereby enhancing the animal's comfort in wearing the garment. The enhanced comfort may ensure that the animal is more compliant in wearing the garment. These embodiments can be used with strong breeds that use a standard collar; they should not be used on animals that have breathing problems. With animals that use a harness, instead of attaching the top clasp 1306 and 1406 to the collar, it can be attached or fastened to the leash ring on the animal's harness.

It is understood that the examples and embodiments described herein are for illustrative purposes only and that various modifications or changes in light thereof will be suggested to persons skilled in the art and are to be included within the spirit and purview of this application and scope of the appended claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

What I claim is:

1. A garment for a four-legged animal comprising:
   a fabric body that is positionable under the animal's tail and around the rear of the animal to safeguard against incontinence or excretion of bodily fluid or matter, the fabric body including:
      a first fabric surface that is positionable adjacent the animal's belly or waist when the fabric body is positioned around the rear of the animal;
      a second fabric surface opposite the first fabric surface, the second fabric surface facing away from the animal when the fabric body is positioned around the rear of the animal;
      a lower portion that is positionable in front of the animal's rear legs and adjacent to or on the animal's belly when the fabric body is positioned under the animal's tail and around the rear of the animal; and
      an upper portion that is positionable under the animal's tail and behind the animal's rear legs when the fabric body is positioned around the rear of the animal, wherein:
      the upper portion is wider than the lower portion such that the fabric body has a triangular shape that facilitates said positioning of the upper portion and lower portion about the animal's body;
      opposing edges of the fabric body between the upper and lower portions have an arcuated configuration that minimizes contact between the opposing edges and the animal's rear legs; and
      a loop is formed in a distal end of the lower portion;
   a first strap having a fastening mechanism attached to a proximal end and a loop formed in a distal end;

a second strap having a fastening mechanism attached to a proximal end and a loop formed in a distal end;

a main strap including a strap body that is inserted through the loop of the lower portion of the fabric body and through the loop of the first strap and the second strap so that the first strap, the second strap, and the lower portion of the fabric body are moveable along the main strap relative to one another, the main strap further including a fastening mechanism positioned on opposing ends of the strap body, the fastening mechanism being coupleable to allow the main strap to be positioned on or adjacent to the animal's belly in front of the animal's rear legs and fastened around the animal's waist; and a pair of upper straps that extend laterally from opposing sides of the upper portion of the fabric body, wherein each upper strap includes a fastening mechanism that is configured to couple with the fastening mechanism of the first or second strap to allow the upper portion of the fabric body to be positioned under the animal's tail behind the animal's rear legs and to couple with the main strap.

2. The garment of claim 1, further comprising a liner that is removably coupleable with the upper portion of the fabric body, the liner including an absorbable material that absorbs bodily fluid excreted by the animal.

3. The garment of claim 1, wherein the fabric body includes a pocket between the first fabric surface and the second fabric surface within which the liner is insertable, and wherein an opening of the pocket is accessible from the upper portion of the fabric body.

4. The garment of claim 1, wherein the fastening mechanism of the first strap, the second strap, the main strap, and the pair of upper straps is a buckle.

5. The garment of claim 1, wherein the main strap is adjustable such that the fabric body is cinchable about the animal's body.

6. The garment of claim 1, wherein the first fabric surface and the second surface are separate materials that are attached together.

7. The garment of claim 1, wherein the main strap includes an elastic member that aids in pulling the fabric body against the animal's body.

8. The garment of claim 1, further comprising a shoulder strap having an elongate strap body, a proximal end, a distal end, and a looped portion, wherein:

the looped portion is configured for positioning over the animal's neck or upper chest;

the proximal end and the distal end each include a fastening mechanism that is configured to releasably couple with the main strap; and the elongate strap body crisscrosses at a single point between the looped portion and the proximal and distal ends.

9. The garment of claim 8, further comprising an adjustment mechanism that is coupled with the elongate strap body at the crisscross of the elongate strap body, the adjustment mechanism being configured to vary a crisscross point of the elongate strap body to adjust a position of the shoulder strap based on a size of the animal.

10. A garment for an animal comprising:

a fabric body that is positionable around the rear of the animal to safeguard against incontinence or excretion of bodily matter, the fabric body including a lower portion that is positionable in front of the animal's rear legs and an upper portion that is positionable behind the animal's rear legs when the fabric body is positioned around the rear of the animal, wherein:

the fabric body has a triangular shape;

a loop is formed in a distal end of the lower portion; and opposing edges of the fabric body between the front and upper portions have an arcuate configuration that minimizes contact between the opposing edges and the animal's rear legs;

a first strap having a fastening mechanism attached to a proximal end and a loop formed in a distal end;

a second strap having a fastening mechanism attached to a proximal end and a loop formed in a distal end;

a main strap including a strap body that is inserted through the loop of the lower portion of the fabric body and through the loop of the first strap and the second strap so that the first strap, the second strap, and the lower portion of the fabric body are moveable along the main strap relative to one another, the main strap further including a fastening mechanism positioned on opposing ends of the strap body, the fastening mechanism being coupleable to allow the lower portion of the fabric body to be positioned in front of the animal's rear legs and coupled about the animal's body; and a pair of upper straps that extend laterally from opposing sides of the upper portion of the fabric body, wherein each upper strap includes a fastening mechanism that is configured to couple with the fastening mechanism of the first or second straps to allow the upper portion to be positioned behind the animal's rear legs and coupled about the animal's body;

wherein when the garment is fit about the rear of the animal, a substantial majority of the animal's back remains exposed and uncovered by the garment.

11. The garment of claim 10, wherein a liner is removably coupleable with the upper portion of the fabric body, the liner including an absorbable material that absorbs bodily fluid excreted by the animal.

12. The garment of claim 10, further comprising a shoulder strap having an elongate strap body, a proximal end, a distal end, and a looped portion, wherein:

the looped portion is configured for positioning over the animal's neck or upper chest;

the proximal end and the distal end each include a fastening mechanism that is configured to releasably couple with the main strap; and the elongate strap body crisscrosses at a single point between the looped portion and the proximal and distal ends.

13. The garment of claim 12, further comprising an adjustment mechanism that is coupled with the elongate strap body at the crisscross of the elongate strap body, the adjustment mechanism being configured to vary a crisscross point of the elongate strap body to adjust a position of the shoulder strap based on a size of the animal.

14. A method of making a garment for an animal comprising:

providing a fabric body, the fabric body being configured for positioning around a rear of the animal to safeguard against incontinence or excretion of bodily matter, the fabric body including a lower portion that is positionable in front of the animal's rear legs and an upper portion that is positionable behind the animal's rear legs when the fabric body is positioned around the rear of the animal, wherein:

the fabric body has a triangular shape;

a loop is formed in a distal end of the lower portion; and opposing edges of the fabric body between the lower portion and the upper portion have an arcuate configuration that minimizes contact between the opposing edges and the animal's rear legs;

providing a first strap having a fastening mechanism attached to a proximal end and a loop formed in a distal end;

providing a second strap having a fastening mechanism attached to a proximal end and a loop formed in a distal end;

providing a main strap having a strap body and a fastening mechanism positioned on opposing ends of the strap body;

inserting the strap body of the main strap through the loop of the lower portion of the fabric body and through the loop of the first strap and the second strap so that the first strap, the second strap, and the lower portion of the fabric body are moveable along the main strap relative to one another, wherein the fastening mechanism of the strap body are coupleable to allow the lower portion of the fabric body to be positioned in front of the animal's rear legs and coupled about the animal's body; and coupling a second attachment component with the upper portion of the fabric body to allow the upper portion to be positioned behind the animal's rear legs and coupled about the animal's body.

15. The method of claim 14, further comprising:
positioning a looped portion of a shoulder strap over a neck or upper chest of the animal; and
coupling a proximal end and a distal end of the shoulder strap with the main strap;
wherein the shoulder strap crisscrosses at a single point between the looped portion and the proximal and distal ends.

16. The method of claim 15, further comprising adjusting an adjustment mechanism that is coupled with the shoulder strap at the crisscross of the shoulder strap to vary a crisscross point of the shoulder strap and thereby adjust a position of the shoulder strap based on a size of the animal.

17. The method of claim 14, further comprising coupling a liner with the upper portion of the fabric body, the liner including an absorbable material that absorbs bodily fluid excreted by the animal.

18. The method of claim 14, wherein coupling the liner with the upper portion of the fabric body comprises inserting the liner through an opening in the upper portion of the fabric body so that the liner is positioned in a pocket in the fabric body.

19. The method of claim 14, wherein providing the fabric body comprises attaching a first material with a second material to form a first surface of the fabric body and a second surface of the fabric body opposite the first surface.

* * * * *